US012738821B2

(12) United States Patent
Schmölz et al.

(10) Patent No.: US 12,738,821 B2
(45) Date of Patent: Sep. 15, 2026

(54) JOINING METHOD AND JOINING APPARATUS FOR INSERTING A COIL WINDING INTO A COMPONENT OF AN ELECTRICAL MACHINE

(71) Applicant: GROB-WERKE Gmbh & Co. KG, Mindelheim (DE)

(72) Inventors: Markus Schmölz, Rieden (DE); Manfred Ziegler, Hiltenfingen (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 190 days.

(21) Appl. No.: 18/627,806

(22) Filed: Apr. 5, 2024

(65) Prior Publication Data

US 2024/0339901 A1 Oct. 10, 2024

(30) Foreign Application Priority Data

Apr. 6, 2023 (EP) .................................... 23166982

(51) Int. Cl.
*H02K 15/06* (2025.01)
*H02K 1/16* (2006.01)
(Continued)

(52) U.S. Cl.
CPC ............. *H02K 15/062* (2013.01); *H02K 1/16* (2013.01); *H02K 3/48* (2013.01); *H02K 2215/00* (2021.08)

(58) Field of Classification Search
CPC .......... H02K 15/062; H02K 1/16; H02K 3/48; H02K 2215/00
See application file for complete search history.

(56) References Cited

U.S. PATENT DOCUMENTS 11,108,308 B2 8/2021 Dreier et al.
11,581,789 B2 2/2023 Haggenmuller et al.
(Continued)

FOREIGN PATENT DOCUMENTS

DE 102018103926 A1 8/2019
DE 102018108615 A1 10/2019
(Continued)

OTHER PUBLICATIONS

English Translation of DE-102020117771-A1 (Year: 2020).*
European Search Report for corresponding European Patent Application No. 23166982 dated Sep. 18, 2023.

*Primary Examiner* — Sean Gugger
(74) *Attorney, Agent, or Firm* — Greer, Burns & Crain, Ltd.

(57) ABSTRACT

A joining method for inserting a coil winding into a component of an electrical machine by: providing the component with an annular arrangement of inwardly opening slots which are bounded by inwardly projecting slot boundaries, providing the coil winding wound with a coil diameter which is equal to or smaller than an inner diameter of the annular arrangement inside the annular arrangement, the coil winding having a plurality of straight conductor sections connected by winding heads, providing radially movable support fingers axially adjacent the slot boundaries, expanding the coil winding outwards while inserting the conductor sections of the coil winding into the slots, and moving the support fingers radially along with the coil winding to guide conductor sections and/or winding heads during insertion.

13 Claims, 5 Drawing Sheets

(51) Int. Cl.
*H02K 3/48* (2006.01)
*H02K 15/062* (2025.01)

(56) References Cited

U.S. PATENT DOCUMENTS

| | | | |
|---|---|---|---|
| 2013/0000105 | A1 | 1/2013 | Hasegawa et al. |
| 2014/0201979 | A1 | 7/2014 | Yamaguchi |
| 2018/0367014 | A1 | 12/2018 | Hashimoto et al. |

FOREIGN PATENT DOCUMENTS

| | | | | |
|---|---|---|---|---|
| DE | 102020117771 | A1 * | 8/2020 | ............. H02K 15/35 |
| DE | 102020130647 | A1 | 1/2021 | |
| DE | 102021134599 | A1 | 2/2022 | |
| EP | 3109982 | B1 | 5/2020 | |
| EP | 3886303 | A1 | 9/2021 | |
| GB | 639069 | A | 6/1950 | |
| GB | 1027777 | A | 4/1966 | |
| WO | 2013035571 | A1 | 3/2013 | |
| WO | 2017102892 | A2 | 6/2017 | |
| WO | 2018019970 | A1 | 2/2018 | |
| WO | 2019020148 | A1 | 1/2019 | |
| WO | 2019166060 | A1 | 9/2019 | |
| WO | 2019166061 | A1 | 9/2019 | |
| WO | 2020187363 | A1 | 9/2020 | |

* cited by examiner

JOINING METHOD AND JOINING APPARATUS FOR INSERTING A COIL WINDING INTO A COMPONENT OF AN ELECTRICAL MACHINE

CROSS-REFERENCES TO RELATED APPLICATIONS

This application claims the benefit of European Patent Application Number 23166982.1 filed on Apr. 6, 2023, the entire disclosure of which is incorporated herein by way of reference.

FIELD OF THE INVENTION

The invention relates to a joining method for inserting a coil winding into a component of an electrical machine. The invention also relates to a joining apparatus for inserting a coil winding into a component of an electrical machine. The invention further relates to an assembly comprising the joining apparatus, the component and the coil winding. Furthermore, the invention relates to a control unit for the joining apparatus and a computer program therefor.

BACKGROUND OF THE INVENTION

For the technological background and prior art, reference is made to the following literature:

[1] WO 2019/020148 A1
[2] WO 2020/187363 A1
[3] WO 2019/166060 A1
[4] WO 2019/166061 A1
[5] WO 2017/102892 A2
[6] DE 10 2020 130 647 A1
[7] EP 3 886 303 A1
[8] GB 1 027 777 A
[9] GB 639 069 A
[10] WO 2018/019970A1
[11] DE 10 2020 117 771 A1
[12] DE 10 2021 134 599 A1
[13] DE 10 2020 130 647 A1
[14] DE 10 2018 108 615 A1
[15] DE 10 2018 103 926 A1

Methods and devices for manufacturing a coil winding, in particular a coil pack with at least one wave winding mat, as well as a coil winding that can be manufactured with it, as also used in embodiments of the invention, are known from [1], [3], [4], [6]. Joining tools—in particular joining mandrels—for transferring the coil winding into a laminated core of a stator as well as methods and devices for fitting the coil winding onto the joining tool are known from [2], [5], [7] and [10]. Furthermore, [5] and also disclose a device and a method for inserting the coil winding formed from rectangular wire from the joining tool into the slots of the laminated core. In this process, wave windings in which the distance between straight conductor sections in the circumferential direction corresponds to the slot spacing on the stator laminated core are held under tension on the joining tool in such a way that their diameter is smaller compared to the relaxed state. During insertion, the wave windings expand again so that they are not or only slightly under tension in the stator slots. Furthermore, a group of straight conductor sections is inserted outwardly into a slot on the stator laminated core via a slider that moves radially outwards, e.g. an expansion plate. This allows straight conductor sections lying on top of each other in the slot to be transferred. However, the surface pressure is quite high, so that wire damage cannot always be excluded. References [1] to [7] relate in particular to coil windings with rectangular wire to obtain a high degree of filling of the stator slots.

Accordingly, one known variant for manufacturing a stator with a wave winding, also referred to as endless hairpin, is that the entire winding or part of the winding is fitted onto a joining tool and transferred into the stator by this joining tool which is designed as a joining mandrel, for example. The transfer into the stator can take place in different variants of the method.

Other methods and devices for inserting round wire windings wound around a joining tool into winding slots between pole shoes are known from [8] and [9]. Here too, wire damage can occur when the wires are transferred into the winding slots.

The invention is based on the problem of making the insertion of a coil winding into a component of an electrical machine more process-reliable.

SUMMARY OF THE INVENTION

To solve this problem, the invention provides a joining method according to one or more embodiments described herein. A joining apparatus, an assembly provided with it, a control unit therefor and a computer program therefor are also described herein.

According to a first aspect thereof, the invention provides a joining method for inserting a coil winding into a component of an electrical machine, the method comprising:

a) providing the component with an annular arrangement of inwardly opening slots which are bounded by inwardly projecting slot boundaries,
b) providing the coil winding wound with a coil diameter equal to or less than an inner diameter of the annular arrangement inside the annular arrangement, the coil winding having a plurality of straight conductor sections connected by winding heads,
c) providing radially movable support fingers axially adjacent the slot boundaries,
d) expanding the coil winding outwards while inserting the conductor sections of the coil winding into the slots, and
e) moving the support fingers radially along with the coil winding to guide conductor sections and/or winding heads during insertion.

Preferably, step a) comprises the step:

a1) providing a ring-shaped base body of a stator.

Preferably, step a) comprises the step:

a2) providing a laminated core of a stator.

Preferably, step a) comprises the step:

a3) providing the component with insulating paper in the individual slots.

Preferably, step b) comprises the step:

b1) providing a coil mat formed from individual wave winding wires to form the coil winding.

Preferably, step b) comprises the step:

b2) providing the coil winding from wires having a rectangular wire cross-section.

Preferably, step b) comprises the step:

b3) providing the coil winding from wires having an insulating layer.

Preferably, step b) comprises the step:

b4) providing the coil winding on a joining tool which is inserted into the interior space within the component having the annular arrangement of inwardly open slots.

Preferably, step b) comprises the step:

b5) compressing the smaller diameter coil mat on a joining mandrel as a joining tool.

Preferably, step b) comprises the step:

b6) providing the coil mat such that the straight conductor sections are inserted in joining tool slots between radially movable guide elements.

Preferably, step c) comprises the step:

c1) providing one support finger per slot boundary of the component.

Preferably, step c) comprises the step:

c2) providing wedge-shaped support fingers which are tapered when viewed from the radial outside to the radial inside.

Preferably, step c) comprises the step:

c3) providing the support fingers with a first and a second side surface that extend substantially in the axial and radial directions and approach each other when viewed from the radial outside to the radial inside.

Preferably, step c) comprises the step:

c4) providing support fingers in a home position in such a way that they each completely cover an end face of one of the slot boundaries pointing in the axial direction.

Preferably, step c) comprises the step:

c5) providing support fingers in a home position in such a way that side surfaces of the support fingers, which side surfaces extend substantially in the axial and radial directions, are at least aligned with slot sides pointing towards the center of the slot and/or circumferentially project to the respective bounded slot beyond edges of the slot boundaries and/or beyond the slot sides pointing towards the center of the slot.

Preferably, step c) comprises the step:

c6) providing support fingers with rounded upper surfaces or upper surfaces flattened at corner edges and pointing substantially in the axial direction.

Preferably, step c) comprises the step:

c7) providing an annular arrangement of support fingers on a support finger movement mechanism for radial movement of the support fingers.

Preferably, the support fingers are provided such that they engage axially between winding heads of the coil winding and the slot boundaries during expansion. Preferably, wires of the coil winding with transition areas between straight wire sections to be inserted into the slots and roof-shaped winding heads are supported on side surfaces and surfaces of the support fingers facing away from the component.

Preferably, step d) comprises the step:

d1) applying a radially outwardly directed force to conductors of the coil winding to expand them radially outwardly and insert them into the slots.

Preferably, step c) comprises the step:

d2) applying a radially directed force to wave winding heads of the coil winding.

Preferably, step e) comprises the following sequence of steps:

e1) moving the support fingers along with the coil winding from a home position over a partial distance to a radial intermediate position between the radially inwardly open mouth and the radially outwardly located slot base of the associated slot;

e2) returning the support fingers from the intermediate position to the home position or to a further intermediate position closer to the home position; and e3) repeating steps e1) and e2).

Preferably, steps e1) and e2) are carried out in such a way that in the home position conductors of the coil winding rest against side surfaces of the support fingers, which side surfaces extend substantially in the axial and radial directions, and in the intermediate position the conductors still rest against the side surfaces or rest against slot walls facing towards the slot center and are urged in the circumferential direction on the side surfaces of the support fingers when the support fingers are returned.

According to a further aspect, the invention provides a joining apparatus for inserting a coil winding into a component of an electrical machine, the joining apparatus comprising:

a holder for the component, which component is provided with an annular arrangement of inwardly opening slots which are bounded by inwardly projecting slot boundaries;

a joining device having a joining tool adapted to place the coil winding wound with a coil diameter equal to or smaller than an inner diameter of the annular arrangement and having a plurality of straight conductor sections connected by winding heads inside the annular arrangement, the joining device being adapted to expand the coil winding outwardly while inserting the conductor sections of the coil winding into the slots, an arrangement of radially movable support fingers axially adjacent the slot boundaries, and a support finger movement mechanism for radially moving the support fingers, and a control unit adapted to control the support finger movement mechanism by means of the joining device as a function of the expansion movement by the coil winding in such a way that the support fingers move radially along with the coil winding to guide conductor sections and/or winding heads during insertion.

It is preferred that the arrangement of support fingers comprises one support finger per slot boundary of the component.

It is preferred that the arrangement of support fingers comprises wedge-shaped support fingers that are tapered when viewed from the radial outside to the radial inside.

It is preferred that the arrangement of support fingers comprises support fingers having a first and a second lateral surface, which surfaces extend substantially in the axial and radial directions and approach each other when viewed from the radial outside to the radial inside.

It is preferred that the arrangement of support fingers for advancing the support fingers in a home position is designed in such a way that the support fingers each completely cover an end face of the respective slot boundaries pointing in the axial direction.

It is preferred that the arrangement of support fingers for advancing the support fingers in a home position is designed in such a way that side surfaces of the support fingers, which side surfaces extend substantially in the axial and radial directions, are at least aligned with slot sides pointing towards the center of the slot. Preferably, these side surfaces of the support fingers circumferentially project to the center of the respective bounded slot beyond edges of the slot boundaries. Preferably, these side surfaces of the support fingers project to the center of the respective bounded slot beyond the slot sides pointing to the center.

It is preferred that the arrangement of support fingers comprises support fingers with rounded upper sides or upper sides that are flattened at corner edges and point substantially in the axial direction.

Preferably, the control unit is adapted to control the support finger movement mechanism for e1) moving the support fingers along with the coil winding expanded by means of the joining device from a home position over a section of the radial expansion movement to an intermediate position, e2) returning the support fingers from the intermediate position to the home position or to a further intermediate position closer to the home position, and e3) repeating steps e1) and e2).

Preferably, the control unit is designed to control the support finger movement mechanism in such a way that in the home position conductors of the coil winding rest against side surfaces of the support fingers, which side surfaces extend substantially in the axial and radial directions, and in the intermediate position the conductors still rest against the side surfaces or rest against slot walls pointing towards the slot center and are urged in the circumferential direction on the side surfaces of the support fingers when the support fingers are returned.

According to a further aspect, the invention provides an assembly comprising a joining apparatus according to one of the preceding embodiments, the component having the annular arrangement of inwardly opening slots, and the coil winding to be inserted into the component by means of the joining apparatus.

Preferably, the component is an annular base body of a stator. Preferably, the component is a laminated core of a stator. Preferably, the component has insulating paper in the individual slots. Preferably, the coil winding comprises a coil mat formed from individual wave winding wires. Preferably, the coil winding comprises a coil mat made of wires with a rectangular wire cross-section. Preferably, the coil winding comprises a coil mat made of wires having an insulating layer.

According to a further aspect, the invention provides a control unit for a joining apparatus or an assembly according to any one of the preceding embodiments, wherein the control unit is adapted to control the joining apparatus for carrying out the joining method according to one of the embodiments described above.

According to a further aspect, the invention provides a computer program comprising instructions causing the joining apparatus according to one of the preceding embodiments or the joining apparatus of the assembly according to one of the preceding embodiments to perform the joining method according to one of the embodiments described above.

Preferred embodiments of the invention relate to a process strategy for reducing the expansion force when inserting coil windings into an e-machine component such as in particular a stator or rotor.

BRIEF DESCRIPTION OF THE DRAWINGS

An exemplary embodiment will be explained in more detail below with reference to the accompanying drawings, wherein it is shown by FIG. 1 an assembly of a joining apparatus, a component and a coil winding, wherein the coil winding, which is wound onto a joining tool of the joining apparatus, and the component are shown side by side.

DETAILED DESCRIPTION OF THE PREFERRED EMBODIMENTS

Figure 1:
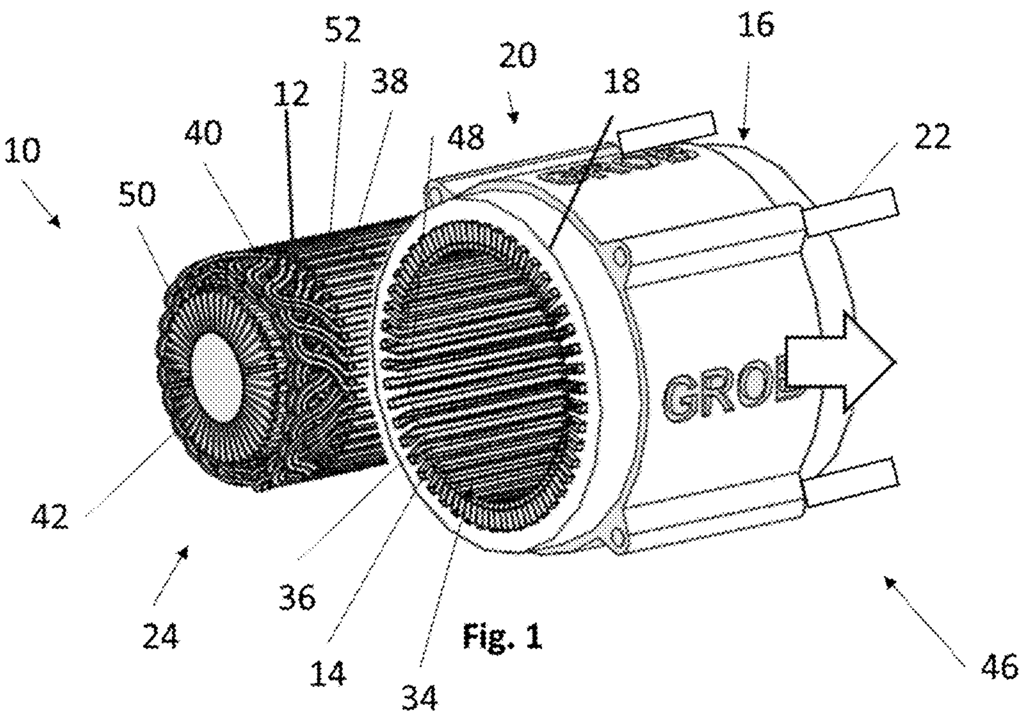

In the following, embodiments of a joining method and a joining apparatus 10 for inserting a coil winding 12, in particular in the form of a wave winding, into slots 14 of a component 16 of an electrical machine, such as a laminated core 18 of a stator 20, are described in more detail.

As can be seen from FIGS. 1 to 3 and 5, the joining apparatus 10 is designed for inserting a coil winding 12 into a component 16 of an electrical machine and comprises a holder 22, a joining device 24, an arrangement 26 of support fingers 28, a support finger movement mechanism 30 and a control unit 32.

The component 16 is provided with an annular arrangement 34 of inwardly opening slots 14 bounded by inwardly projecting slot boundaries 36.

The coil winding 12 has a plurality of straight conductor sections 38 that are connected by winding heads 40.

The joining device 24 comprises a joining tool 42. The joining tool 42 is designed to arrange the coil winding 12 inside the annular arrangement 34. For this purpose, the coil winding 12 is wound onto the joining tool 42 with a smaller coil diameter which is equal to or smaller than the inner diameter of the arrangement 34 of slots 14, i.e., in this case in particular equal to or preferably smaller than the inner diameter of the laminated core 18. Furthermore, the joining tool 42 is designed to outwardly expand the coil winding 12 inserted in this way, and the straight conductor sections 38 of the coil winding 12 are inserted into the slots 14.

The support fingers 28 of the arrangement 26 of support fingers are radially movable and axially disposed adjacent the slot boundaries 36. The support finger movement mechanism 30 is configured to radially move the support fingers 28.

The control unit 32 is adapted to control the support finger movement mechanism 30 as a function of the expansion movement, by which the coil winding 12 is expanded by means of the joining device 24, in such a way that the support fingers 28 move radially along with the coil winding 12 to guide conductor sections 38 and/or winding heads 40 during insertion.

The joining method is used to insert the coil winding 12 into the component 16 of an electrical machine and comprises the steps:

a) providing the component 16 with the annular arrangement 34 of inwardly opening slots 14 defined by inwardly projecting slot boundaries 36, b) providing the coil winding 12 wound with the coil diameter which is equal to or smaller than the inner diameter of the annular arrangement 34 inside the annular arrangement 34, c) providing the radially movable support fingers 28 axially next to the slot boundaries 36, d) expanding the coil winding 12 outwards while inserting the conductor sections 38 of the coil winding into the slots 14, and e) moving the support fingers 28 radially along with the coil winding 12 to guide conductor sections 38 and/or winding heads 40 during insertion.

In particular, the control unit 32 is adapted to control the joining apparatus 10 for carrying out the joining process. For this purpose, the control unit 32 is designed as an electronic control unit comprising a computing unit with a corresponding computer program.

As can be seen in particular from FIGS. 1 to 5, the coil winding 12 designed as a wave winding comprises conductors 44.1, 44.2, 44.3, 44.4 which are previously bent in a meander shape and provided with an insulator layer, such as in particular wires which have the straight conductor sections 38 and approximately roof-shaped bent sections—so-called winding heads 40—between them. The coil winding 12 is present, for example, as a wave winding mat as described and shown in [1], [3], [4] or [6]. Reference is expressly made to these references for further details of the winding.

Figure 2:
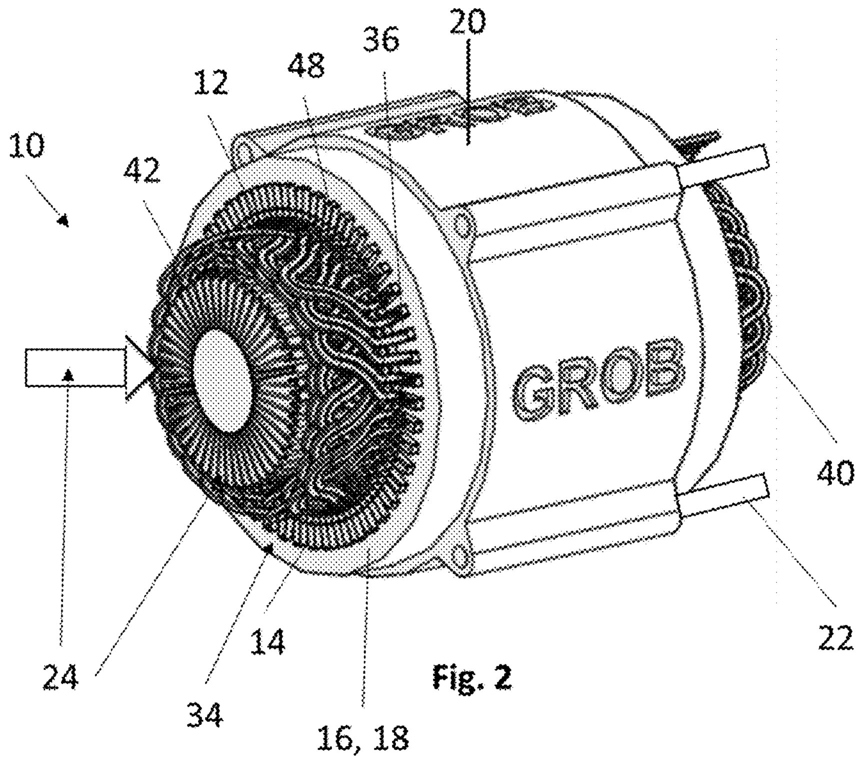
FIG. 2 the assembly of FIG. 1, wherein the joining tool carrying a compressed coil winding is inserted into the component.
Figure 3:
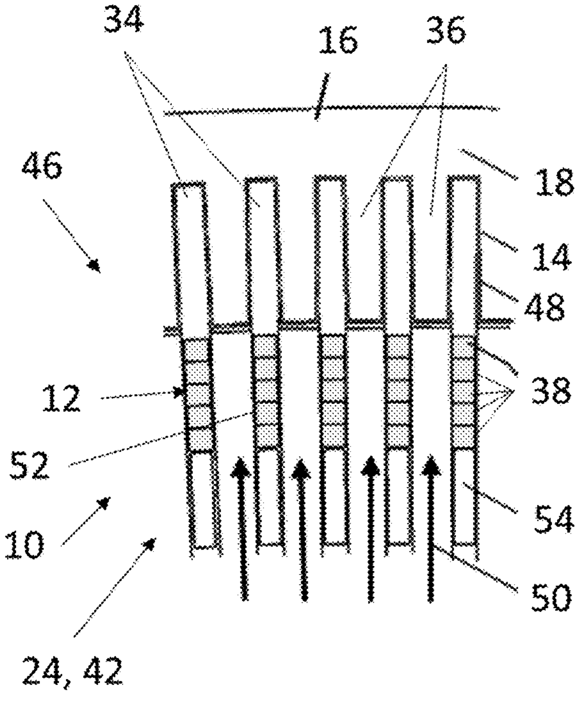
FIG. 3 a section through a circumferential section of the assembly.

As shown in FIGS. 1 to 3, the coil winding 12 is first fitted to the joining device 24 for transferring the winding into the laminated core 18, as described and shown in [2], [5], or [7]. For further details regarding the general structure of the joining device 24 and a winding support of the same designed as a joining tool 42 (also called joining mandrel), explicit reference is made to these references [2], [5] and in particular [10]. Wave windings in which the distance between straight conductor sections 38 in the circumferential direction corresponds to the slot spacing on the laminated core 18 are held under tension on the joining tool 42 in such a way that their coil diameter is smaller compared to the relaxed state. During insertion, the wave windings expand again so that they are not or only slightly under tension in the slots 14.

FIG. 1 shows an assembly 46 consisting of the joining apparatus 10, the component 16 and the coil winding 12. In particular, FIG. 1 shows the joining tool 42 and the laminated core 18 arranged next to each other. FIG. 2 shows a combination of these parts, with the joining tool 42 inserted into the laminated core 16. FIG. 3 shows a section through a sub-section of a circumference of the combination of laminated core 18 and joining tool 42 inserted and aligned therein.

The component 16 is annular in shape and comprises the arrangement 34 of inwardly open slots 14 with slot boundaries 36 between them. In the embodiments shown, the slots 14 of the laminated core 18 are each insulated with a slot insulation in the form of insulating paper 48.

The joining tool 42 comprises an arrangement of guide plates 50 distributed around a central axis, which guide plates 50 delimit tool slots 52 in which the straight conductor sections 38 of the coil winding 12 can be accommodated. The guide plates 50 serve as guide elements for guiding the conductor sections 38 during transfer.

For insertion, the straight conductor sections 38 are pushed into the slots 14, for example by means of radially outwardly moving sliders 54 of the joining tool 42. The coil winding 12 is thereby expanded from the smaller diameter with which it rests compressed on the joining tool to the larger diameter with which it is inserted into the component 16 during operation.

Figure 4:
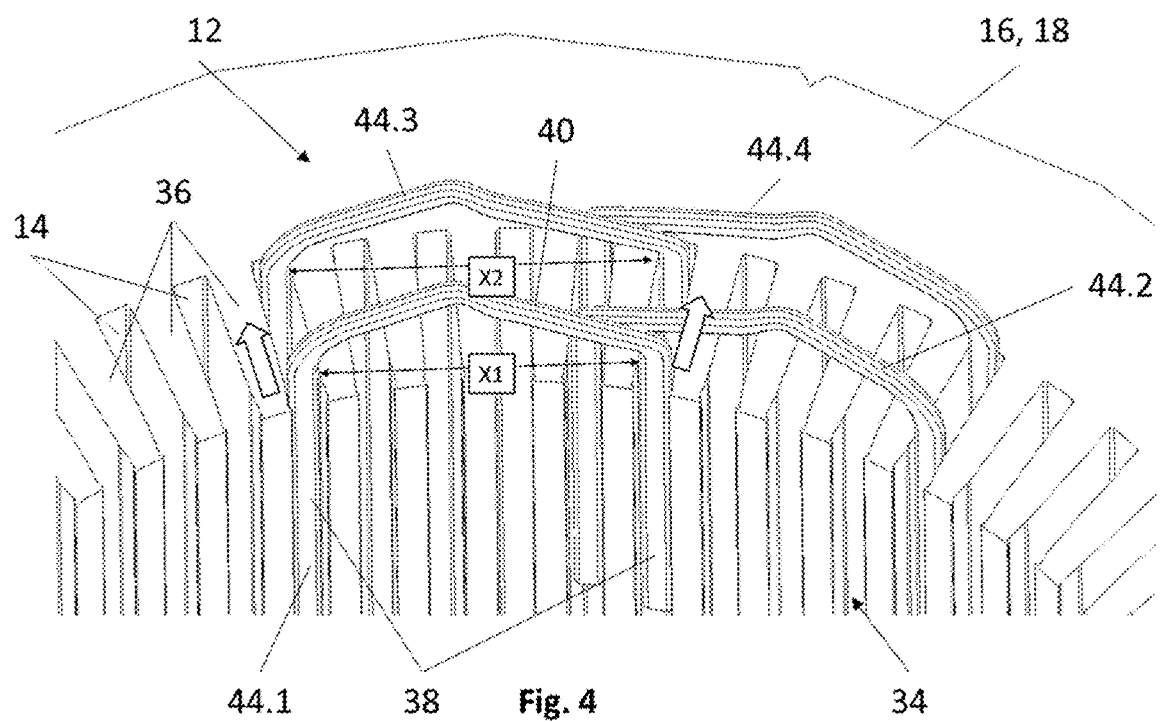
FIG. 4 a perspective view of the circumferential section of the assembly of FIG. 1 to illustrate the joining process, wherein only some of the wires of the coil winding to be inserted are shown for illustration purposes.

FIG. 4 shows the expansion process. When the individual conductors 44.1-44.4 are inserted, distance X1 between the straight conductor sections 38, which are each connected to each other by a common winding head 40, is increased to distance X2.

To summarize briefly, during stator manufacture using the “wave winding” method, the wire coils are inserted into the inner diameter of the laminated core 18 and then expanded outwards.

During this expansion, the conductors 44.1-44.4 are widened by a certain amount (X1 to X2). This requires deformation energy to be applied. In addition, the conductors 44.1-44.4 or the insulation paper 18 must be prevented from being damaged. In particular, the insulation layer of the conductors 44.1-44.4 should remain intact even if the production is carried out in a rapid cycle sequence.

For this reason, as shown in FIG. 4, the support fingers 28 are advanced during expansion. These support fingers 28 form a defined bending edge and serve as a guide to protect the conductors 44.1-44.4, the insulating paper 48 and the laminated core 18.

Figure 5:
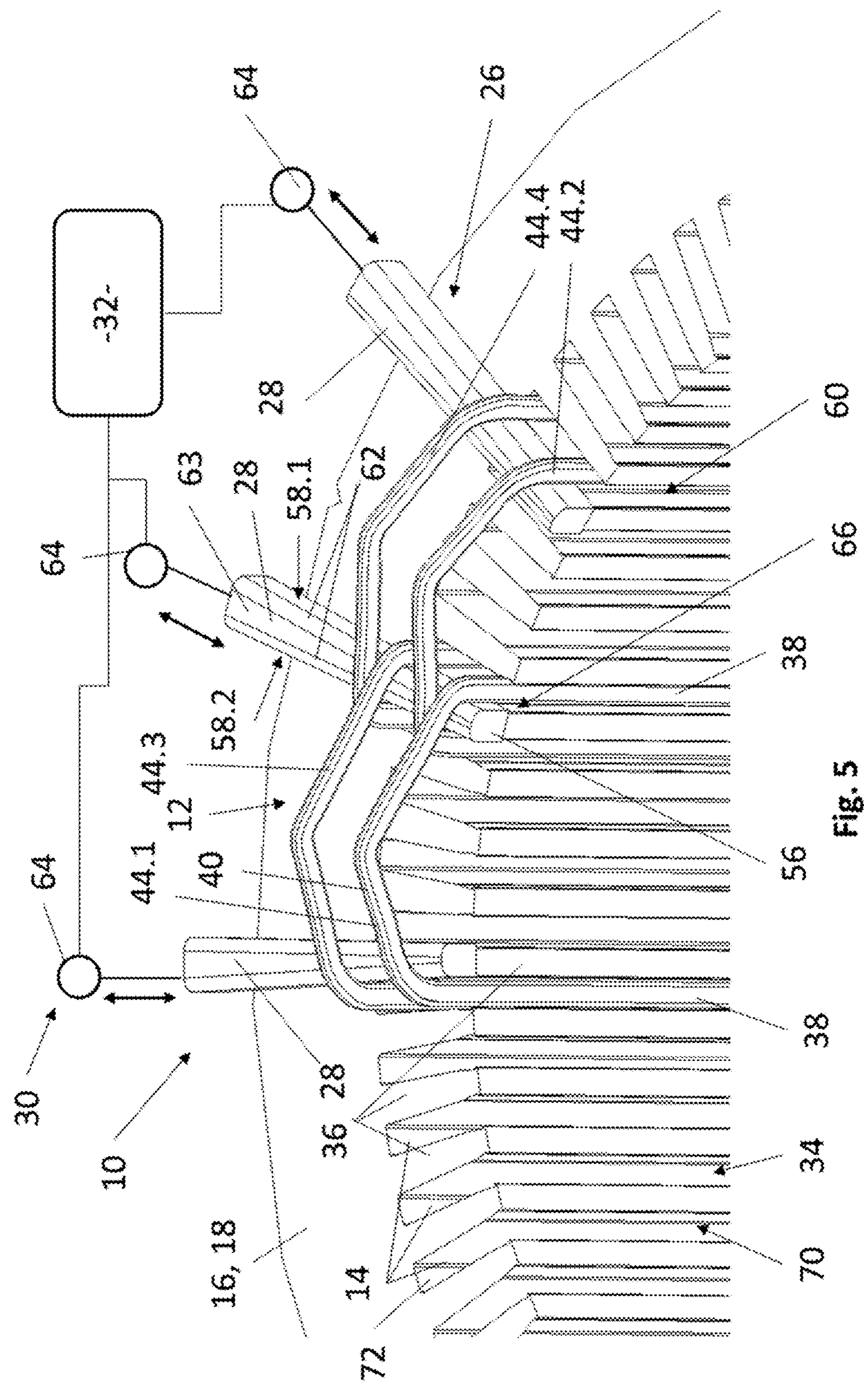
FIG. 5 a representation as in FIG. 4, wherein an arrangement of radially movable support fingers, a support finger movement mechanism for radially moving the support fingers, and a control unit are additionally indicated as further parts of the joining apparatus.

For reasons of clarity, only four of the conductors 44.1-44.4 and only three support fingers 28 are shown in FIGS. 4 and 5. As can be seen from FIGS. 1 to 3, in practice far more conductors, such as wires in particular, are to be inserted and accordingly also more support fingers 28 to be used. In particular, the arrangement 26 of support fingers comprises one support finger 28 per slot boundary 36.

The support fingers 28 are wedge-shaped and tapered when viewed from the radial outside to the radial inside. In particular, the support fingers 28 have a radially inner end 56 with a smaller cross-section than radially further out. In particular, the radially inner end 56 has an end surface extending in the circumferential direction and axial direction.

Each support finger 28 has a first and a second side surface 58.1, 58.2, which side surfaces extend substantially (i.e., +/−10 degrees) in the axial and radial directions and approach each other when viewed from the radial outside to the radial inside. The ends of the straight conductor sections 38 that merge into the winding head 40 rest against these side surfaces 58.1, 58.2.

At the beginning of the joining process, the support fingers 28 are provided in a home position 66 shown in FIG. 5. In the home position, the support fingers 28 each completely cover an end face of one of the slot boundaries 36 pointing in the axial direction.

In the home position 66, the support fingers 28 are arranged in particular in such a way that the side surfaces 58.1, 58.2 of the support fingers 28, which side surfaces extend substantially in the axial and radial directions, are at least aligned with slot sides 60 pointing towards the center of the slot 14. In the embodiment of FIG. 5, the side surfaces 58.1, 58.2 circumferentially project to the center of the respective bounded slot beyond edges of the slot boundaries 36 and beyond the slot sides 60 pointing towards the center of the slot 14. Moreover, the support fingers 28 have upper sides 63 which are rounded or flattened at corner edges 62 and point substantially in the axial direction. The corner edges 62 are designed to support the lateral curved areas of the winding heads 40.

The support finger movement mechanism 30 is designed for radial movement of the support fingers 28. This is indicated in FIG. 5 by several movement units 64. These can be individual actuators that are controlled by the control unit 32, or conversion elements of a transmission that converts the movement of an actuator controlled by the control unit 32 into a radial movement of all connected support fingers 28. Examples of such transmissions are known from [14] and [15].

In a comparative example of the joining process that is not covered by the invention, the support fingers 28 are only moved at the beginning of the joining process and remain in position until the end of the process.

When expanding the conductors 44.1-44.4, a great deal of force is required due to the necessary wire deformation. In addition, there is a lot of friction between the conductors 44.1-44.4/or the coils, between the conductors 44.1-44.4 and the support fingers 28 and between the conductors 44.1-44.4 and the insulation paper 18 or the stator.

Especially the friction between support fingers 28 and conductors 44.1-44.4 is very high in the comparison example.

Due to the resulting forces that occur during expansion, the outer layers of conductors 44.1-44.4 press on the inner layers with a force so high that damage can occur between the conductors 44.1-44.4 ("wire to wire" damage). This damage can cause the stator to fail.

With the joining methods and the joining apparatus 10 according to embodiments of the invention, the forces during expansion should be reduced as much as possible.

Compared to the comparative example, the sequence is changed in such a way that the individual forces no longer occur simultaneously, but with a time delay. As a result, the forces cannot add up and the total load on the wires remains as low as possible.

Figure 6:
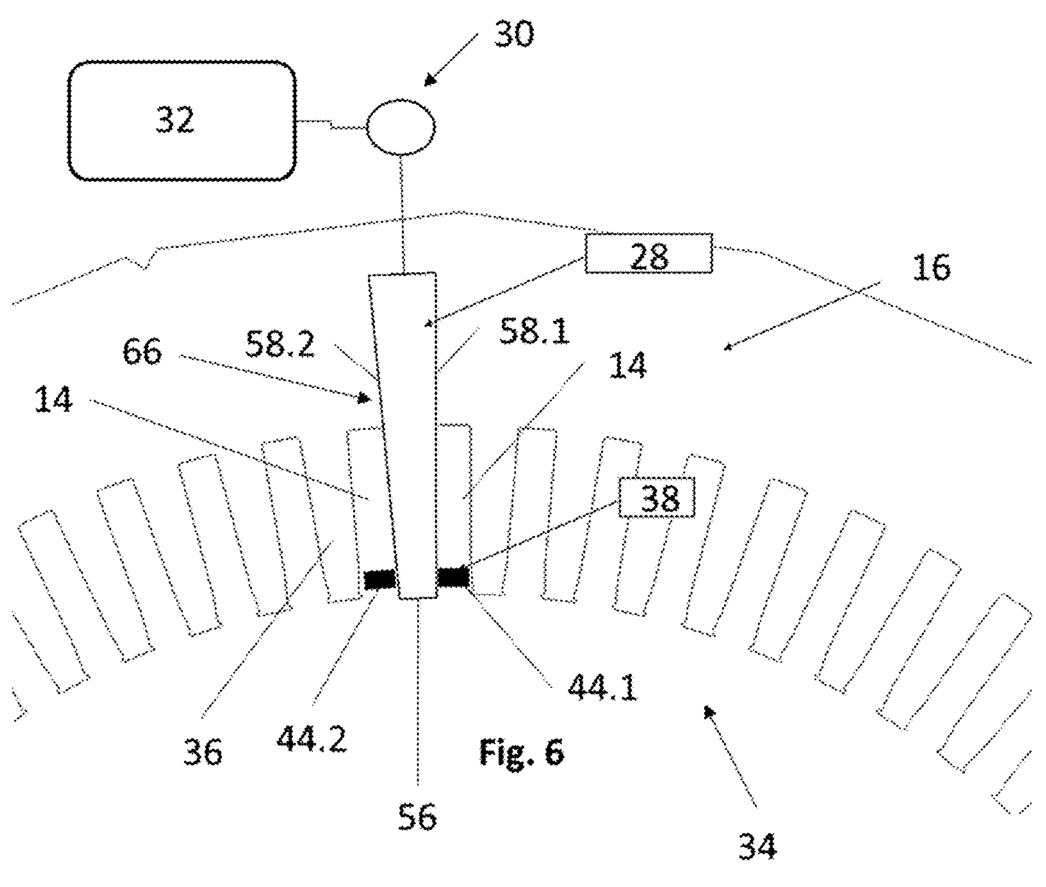
FIG. 6 a schematic, greatly simplified axial plan view of the assembly consisting of the component, the joining apparatus and the coil winding during a first step of an expansion process.
Figure 7:
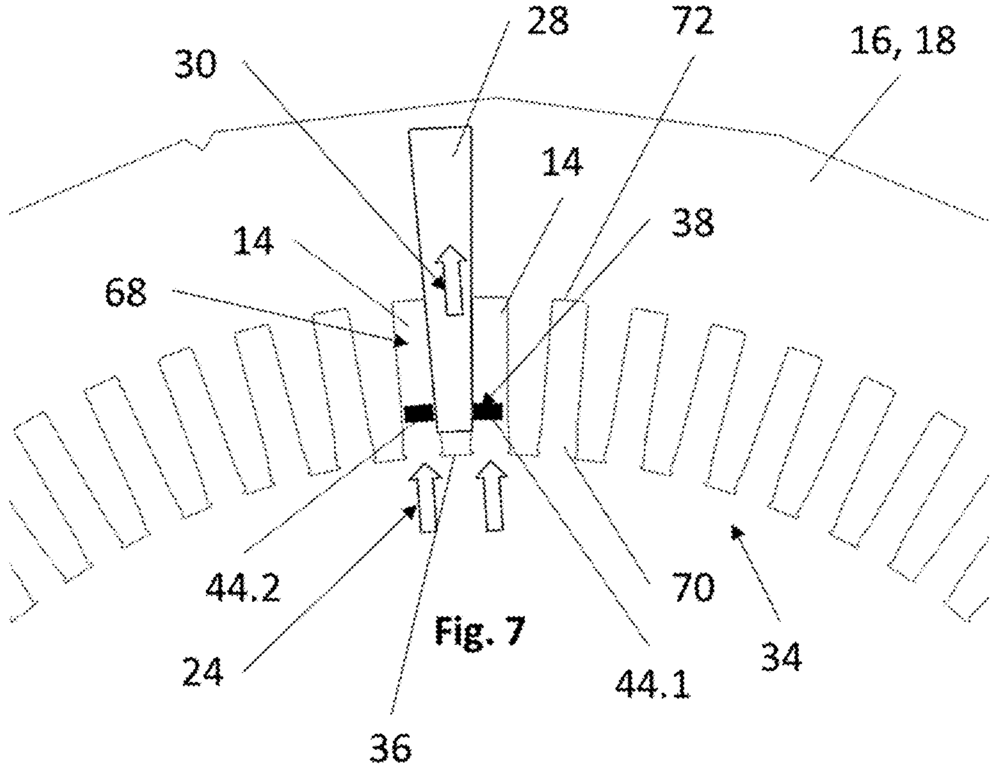
FIG. 7 a view as in FIG. 6 during a subsequent second step of the expansion process.

As shown in FIGS. 6 and 7, the support fingers 28, which are anyway designed to be movable for advancement, are synchronized with the expanding process so that they can move outwards along with the conductors 44.1-44.4 during expansion.

Figure 8:
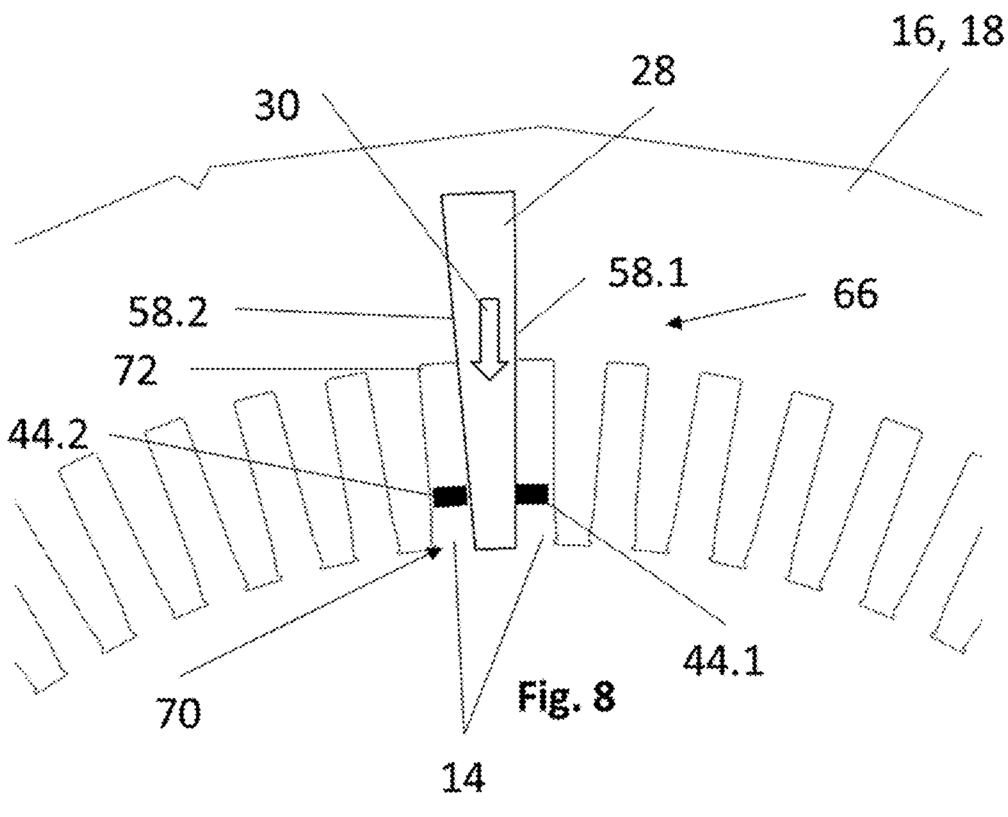
FIG. 8 a view as in FIGS. 6 and 7 during a subsequent third step of the expansion process.
Figure 9:
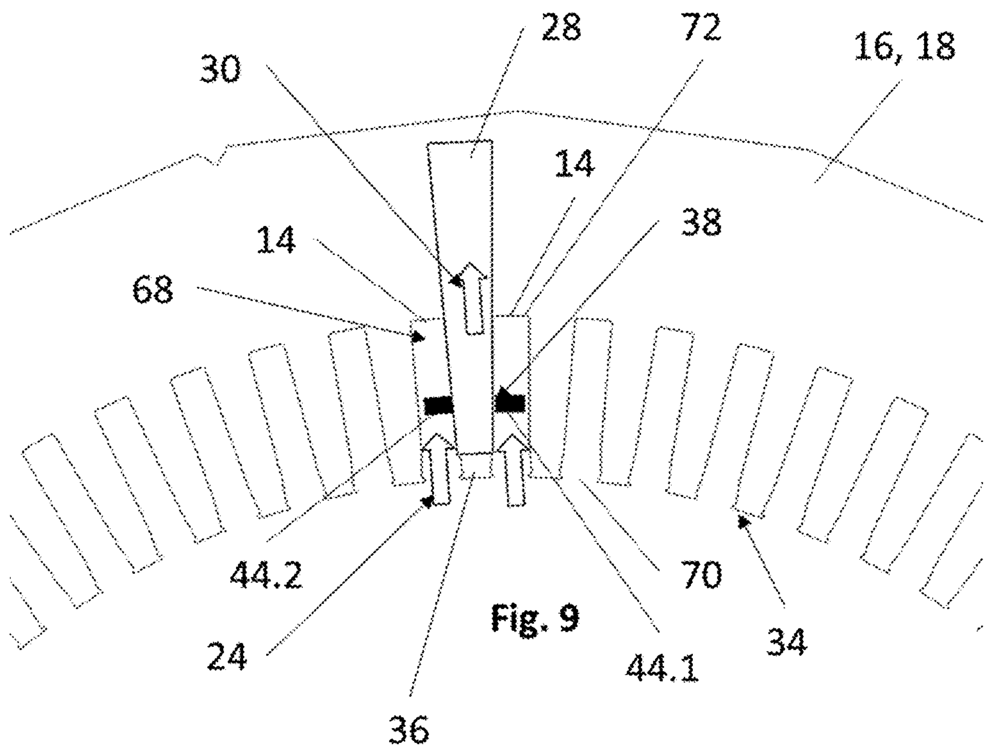
FIG. 9 a view as in FIGS. 6 to 8 during a subsequent fourth step of the expansion process.

As further shown in FIGS. 8 and 9, in the illustrated embodiment the expanding process stops after a certain stroke, the support fingers 28 are advanced again and the process is repeated until the conductors 44.1-44.4 of the coil winding 12 are completely expanded. With this gradually co-moving support finger 28, the friction between the support finger 28 and the conductor 44.1-44.4 is removed during the expansion process without the function of the support finger 28 being lost.

According to this principle, the support fingers 28 have a supporting effect in that the friction between the conductor 44.1-44.4 and the support finger 28 is used as a pulling force for the expansion.

FIG. 6 shows in more detail the advancing of the support finger 28 in the home position 66 and the initial insertion of the conductors 44.1, 44.2. FIG. 7 shows how the conductors 44.1, 44.2 and support fingers 28 together move radially outwards. For example, the support fingers 28 are moved along with the coil winding 12 from the home position 66 over a partial distance to a radial intermediate position 68 between the radially inwardly open mouth 70 and the radially outwardly located slot base 72 of the associated slot 14. In this radial intermediate position 68—reversing position—the movement of the support fingers 28 is reversed.

As can be seen in FIGS. 6 and 7, in the home position 66 the conductors 44.1, 44.2 of the coil winding 12 rest against the side surfaces 58.1, 58.2 of the support fingers 28. In the intermediate position 68 the conductors 44.1, 44.2 still rest against the side surfaces 58.1, 58.2 or are just beginning to rest against slot walls pointing towards the center of the slot.

As can be seen in FIG. 8, the conductors 44.1, 44.2 are urged in the circumferential direction on the side surfaces 58.1, 58.2 of the support fingers 28 when the support fingers 28 are returned.

FIG. 8 shows the follow-up movement of the support finger 28. The support finger 28 can, for example, be returned to the home position 66. It is also conceivable that the support finger 28 is moved to a further intermediate position (not shown) between the home position 66 and the reversing position 68 shown in FIG. 7. FIG. 9 shows the repeated joint movement of the support finger 28 and the conductors 44.1, 44.2 radially outwards.

The temporal separation of the forces makes the process more stable and reduces the risk of wire damage.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 joining apparatus
12 coil winding
14 slot (component)
16 component
18 laminated core
20 stator
22 holder
24 joining device
26 arrangement of support fingers
28 support finger
30 support finger movement mechanism
32 control unit
34 arrangement of slots
36 slot boundary
38 straight conductor section
40 winding head
42 joining tool
44.1-44-4 conductor
46 assembly of joining tool-component-coil winding
48 insulation paper
50 guide plate
52 tool slot
54 slider
56 radially inner end
58.1 first side surface
58.2 second side face
60 slot side
62 corner edge
63 upper side
64 movement unit
66 home position
68 intermediate position (reversing position)
70 mouth of slot
72 slot base

The invention claimed is:

1. A method for inserting a coil winding into a component of an electrical machine, the method comprising:

a) providing the component with an annular arrangement of inwardly opening slots which are bounded by inwardly projecting slot boundaries, b) providing the coil winding wound with a coil diameter which is equal to or smaller than an inner diameter of the annular arrangement inside the annular arrangement, the coil winding having a plurality of straight conductor sections which are connected by winding heads, c) providing radially movable support fingers axially adjacent the slot boundaries, d) expanding the coil winding outwards while inserting the straight conductor sections of the coil winding into the inwardly opening slots, and e) moving the radially movable support fingers radially along with the coil winding to guide the straight conductor sections, or the winding heads, or both during insertion of the straight conductor sections of the coil winding into the inwardly opening slots, wherein step e) comprises:

e1) during insertion of the straight conductor sections of the coil winding into the inwardly opening slots, moving the radially movable support fingers along with the coil winding from a home position over a partial distance to a radial intermediate position between a radially inwardly open mouth and a radially outwardly located slot base of the associated inwardly opening slot, wherein the home position is located radially inwardly of the intermediate position, and, in the home position, the radially moveable support fingers each cover one of the slot boundaries which points in an axial direction, e2) during insertion of the straight conductor sections of the coil winding into the inwardly opening slots, returning the radially movable support fingers from the radial intermediate position to the home position or to a further intermediate position closer to the home position, and e3) repeating steps e1) and e2) during insertion of the straight conductor sections of the coil winding into the inwardly opening slots.

2. The method according to claim 1, wherein step a) comprises at least one or more of:

a1) providing an annular base body of a stator;

a2) providing a laminated core of the stator, and a3) providing the component with insulating paper in the individual inwardly opening slots.

3. The method according to claim 1, wherein step b) comprises at least one or more of:

b1) providing a coil mat formed from individual wave winding wires for forming the coil winding;

b2) providing the coil winding from wires having a rectangular wire cross-section;

b3) providing the coil winding from wires having an insulating layer;

b4) providing the coil winding on a joining tool which is inserted into an interior space inside the component having the annular arrangement of inwardly open slots;

b5) compressing the smaller diameter coil winding on a joining tool; and, b6) providing the coil winding in such a way that the straight conductor sections are inserted into joining tool slots between radially movable guide elements.

4. The method according to claim 1, wherein step c) comprises at least one or more of:

c1) providing one support finger of the radially moveable support fingers per slot boundary of the component;

c2) providing each of the radially moveable support fingers with a wedge-shape which is tapered when viewed from a radial outside to a radial inside;

c3) providing each of the radially moveable support fingers with a first side surface and a second side surface, wherein the first and second side surfaces extend substantially in an axial direction and the radial direction and approach each other when viewed from a radial outside to a radial inside, c4) providing each of the radially moveable support fingers in the home position in such a way that the radially moveable support fingers each completely cover an end face of one of the slot boundaries which points in an axial direction;

c5) providing each of the radially moveable support fingers in the home position in such a way that side surfaces of the radially moveable support fingers, which extend substantially in an axial direction and a radial direction, are aligned at least with slot sides pointing towards a center of the slot or circumferentially project to the center of a respective bounded slot beyond edges of the slot boundaries, or beyond the slot sides pointing towards a center of the slot, or a combination thereof, c6) providing each of the radially moveable support fingers with rounded upper sides or upper sides flattened at corner edges and pointing substantially in an axial direction; and, c7) providing an annular arrangement of the radially moveable support fingers on a support finger movement mechanism for radial movement of the support fingers.

5. The method according to claim 1, wherein step d) comprises at least one or more of:

d1) applying a radially outwardly directed force to the straight conductor sections of the coil winding to expand the straight conductor sections radially outwardly and insert the straight conductor sections into the inwardly opening slots; and, d2) applying a radially directed force to the winding heads of the coil winding.

6. The method according to claim 1, wherein steps e1) and e2) are carried out in such a way that in the home position the straight conductor sections of the coil winding rest against side surfaces of the radially movable support fingers, which side surfaces extend substantially in an axial direction and a radial direction, and in the intermediate position the straight conductor sections still rest against the side surfaces or rest against slot walls pointing towards a slot center and are urged in a circumferential direction on the side surfaces of the radially movable support fingers when the radially movable support fingers are returned.

7. The apparatus according to claim 1, wherein the control unit is further configured to actuate the support finger movement mechanism in such a way that in the home position the straight conductor sections of the coil winding rest against side surfaces of the radially movable support fingers, which side surfaces run substantially in an axial direction and a radial direction, and in the intermediate position the straight conductor sections still rest against the side surfaces or rest against slot walls facing a slot center and are urged against the side surfaces of the radially movable support fingers in a circumferential direction when the radially movable support fingers are returned.

8. A control unit configured to perform the method according to claim 1.

9. A non-transitory computer readable media storing a computer program comprising instructions configured to cause an apparatus to perform the method according to claim 1.

10. An apparatus for inserting a coil winding into a component of an electrical machine, the apparatus comprising:

a holder for the component which is provided with an annular arrangement of inwardly opening slots which are bounded by inwardly projecting slot boundaries;

a joining device comprising a joining tool designed for arranging the coil winding wound with a coil diameter equal to or smaller than an inner diameter of the annular arrangement and having a plurality of straight conductor sections which are connected by winding heads inside the annular arrangement, the joining device configured to expand the coil winding outwardly while inserting the straight conductor sections of the coil winding into the inwardly opening slots, an arrangement of radially movable support fingers axially adjacent the slot boundaries, and a support finger moving mechanism for radially moving the radially movable support fingers, and a control unit configured to control the support finger movement mechanism with the joining device as a function of an expansion movement by the coil winding in such a way that the radially movable support fingers move radially along with the coil winding to guide the straight conductor sections, or the winding heads, or both during insertion, wherein the control unit is further configured to control the support finger movement mechanism for e1) moving the support fingers along with the coil winding expanded with the joining device from a home position over a section of a radial expansion movement to an intermediate position, wherein the home position is located radially inwardly of the intermediate position, and, in the home position, the radially moveable support fingers each cover one of the slot boundaries which points in an axial direction, e2) returning the support fingers from the intermediate position to the home position or to a further intermediate position closer to the home position, and e3) repeating steps e1) and e2).

11. The apparatus according to claim 10, wherein the arrangement of the radially movable support fingers comprises:

one support finger of the radially movable support fingers per slot boundary of the component; or each of the radially movable support fingers have a wedge-shape which is tapered when viewed from a radial outside to a radial inside; or each of the radially movable support fingers has a first side surface and a second side surface, the first and second side surfaces extend substantially in an axial direction and a radial direction and approach each other when viewed from a radial outside to a radial inside; or the arrangement of radially movable support fingers, for advancing the radially movable support fingers in a home position, is configured such that each radially movable support finger completely covers an end face of the respective slot boundaries which points in an axial direction; or side surfaces for the radially movable support fingers, which side surfaces extend substantially in an axial direction and a radial direction, are at least aligned with slot sides pointing towards a center of the slot or circumferentially project to a center of the respective bounded slot beyond edges of the slot boundaries, or beyond the slot sides pointing towards the center of the slot, or both; or each of the radially movable support fingers has rounded upper sides or upper sides flattened at corner edges and pointing substantially in the axial direction; or any combination thereof.

12. An assembly comprising:

the apparatus according to claim 10, the component having the annular arrangement of the inwardly opening slots, and the coil winding to be inserted into the component with the joining apparatus.

13. The assembly according to claim 12, wherein the component is an annular base body of a stator, or is a laminated core of a stator, or has insulating paper in the individual inwardly opening slots; or wherein the coil winding a coil mat formed from individual wave winding wires, or comprises a coil mat made of wires having a rectangular wire cross-section; or comprises a coil mat made of wires having an insulating layer; or any combination thereof.

* * * * *